US009969044B2

(12) United States Patent
Seitz et al.

(10) Patent No.: US 9,969,044 B2
(45) Date of Patent: May 15, 2018

(54) PROFILE ELEMENT, FRAME ELEMENT AND CABIN WALL SECTION OF A NUMERICALLY CONTROLLED MACHINE TOOL

(71) Applicants: DMG MORI AKTIENGESELLSCHAFT, Beilefeld (DE); DMG MORI CO., LTD., Yamatokoriyama-shi, Nara (JP)

(72) Inventors: Reinhold Seitz, Hopferau (DE); Alexander Strebelow, Wasserburg (DE)

(73) Assignees: DMG MORI AKTIENGESELLSCHAFT, Bielefeld (DE); DMG MORI CO., LTD., Yamatokoriyama-shi (JP)

( * ) Notice: Subject to any disclaimer, the term of this patent is extended or adjusted under 35 U.S.C. 154(b) by 0 days. days.

(21) Appl. No.: 15/021,859

(22) PCT Filed: Sep. 11, 2014

(86) PCT No.: PCT/EP2014/069400
§ 371 (c)(1),
(2) Date: Mar. 14, 2016

(87) PCT Pub. No.: WO2015/036485
PCT Pub. Date: Mar. 19, 2015

(65) Prior Publication Data
US 2016/0229016 A1 Aug. 11, 2016

(30) Foreign Application Priority Data
Sep. 13, 2013 (EP) ..................................... 13184336

(51) Int. Cl.
*B23Q 11/08* (2006.01)
*F16B 1/00* (2006.01)
(Continued)

(52) U.S. Cl.
CPC ............ *B23Q 11/0891* (2013.01); *F16B 1/00* (2013.01); *B60J 1/007* (2013.01); *F16B 2001/0028* (2013.01); *F16P 1/02* (2013.01)

(58) Field of Classification Search
CPC ................... B23Q 11/0891; F16B 1/00; F16B 2001/0028; F16P 1/02; B60J 1/007; B60J 1/02
See application file for complete search history.

(56) References Cited

U.S. PATENT DOCUMENTS 3,668,808 A   6/1972 Perina
3,745,709 A   7/1973 Perina
(Continued)

FOREIGN PATENT DOCUMENTS

DE   201 11 682 U1   10/2001
EP   0 597 624 A1    5/1994
(Continued)

OTHER PUBLICATIONS

Mar. 5, 2015 Search Report issued in International Patent Application No. PCT/EP2014/069400.
(Continued)

*Primary Examiner* — Beth A Stephan
(74) *Attorney, Agent, or Firm* — Oliff PLC (57) ABSTRACT

A profile element for forming a frame element for a cabin wall of a numerically controlled machine tool is disclosed. A cross-section of the profile element has at least one receiving section for receiving a first securing element, at least one arch-shaped section, and at least one connecting section for connecting the frame element to the cabin wall of the machine tool. The arch-shaped section is arranged between the receiving section and the connecting section.

10 Claims, 9 Drawing Sheets

(51) Int. Cl.
    F16P 1/02        (2006.01)
    B60J 1/00        (2006.01)

(56) References Cited

U.S. PATENT DOCUMENTS

| | | | | |
|---|---|---|---|---|
| 4,879,854 A | * | 11/1989 | Handler | E04B 2/7407 |
| | | | | 160/135 |
| 4,897,975 A | | 2/1990 | Artwick et al. | |
| 5,413,397 A | | 5/1995 | Gold | |
| 6,810,635 B2 | * | 11/2004 | Meizlish | B60J 10/70 |
| | | | | 296/201 |
| 8,776,475 B2 | * | 7/2014 | Williamson | B60R 13/04 |
| | | | | 52/716.5 |
| 2003/0070391 A1 | * | 4/2003 | Tachauer | A44B 18/0049 |
| | | | | 52/745.21 |

FOREIGN PATENT DOCUMENTS

| | | | | |
|---|---|---|---|---|
| EP | 0597624 A1 | * | 5/1994 | ................ B60J 1/08 |
| EP | 0 705 726 A2 | | 4/1996 | |
| EP | 2848361 A1 | * | 3/2015 | ......... B23Q 11/0891 |
| FR | 2 571 091 A1 | | 4/1986 | |
| FR | 2 796 764 A1 | | 1/2001 | |

OTHER PUBLICATIONS

Nov. 13, 2014 Office Action issued in European Patent Application No. 13184336.9.

* cited by examiner

PROFILE ELEMENT, FRAME ELEMENT AND CABIN WALL SECTION OF A NUMERICALLY CONTROLLED MACHINE TOOL

The present invention relates to a profile element, a frame element for a numerically controlled machine tool and a cabin wall section of the numerically controlled machine tool, wherein said elements have a less complex structure, can be produced in a more cost-effective manner, can be adapted to various machine types with less effort and wear out less rapidly.

The prior art knows cabins of numerically controlled machine tools which have large windows with viewing glasses, through which the operating staff can monitor and check the machining process of the workpiece. The cabin wall sections of a numerically controlled machine tool, which have a window, have to be newly designed and manufactured separately for every machine tool and every type. This increases the production period and the costs for the machine tool. Furthermore, it is a drawback that in the vicinity in which machine tools are used, e.g. production halls, dirt and dust is inevitably produced. As a result, the windows and the window frames thereof can become dirty, can scratch or be damaged in another way over the long service life of a machine tool. This can lead to a poorer view through the window, which can impair the production quality of the workpieces when the operating staff cannot monitor the operational steps in an optimum fashion.

An object of the present invention is to provide a profile element for forming a frame element, a frame element and a cabin wall section including the frame element of a numerically controlled machine tool, wherein said elements have a less complex structure, can be produced in a more cost-effective manner, can be adapted to various machine types with less effort and wear out less rapidly.

This object is achieved by the invention according to the independent claims. Other preferred further developments of the invention are described in the dependent claims.

The profile element according to the invention can be provided for forming a frame element for a cabin wall of a numerically controlled machine tool. A cross-section of the profile element can have at least one receiving section for receiving a first securing element. In addition, the cross-section of the profile element can have at least one arch-shaped section and at least one connecting section for connecting the window frame to the cabin wall of the machine tool. The arch-shaped section can be arranged between the receiving section and the connecting section.

The various sections of the cross-section of the profile element are here arranged in the cross-sectional direction. The term 'arch-shaped' substantially means that this section of the cross-section of the profile element has a form which is not fully flat. The arch-shaped section of the cross-section of the profile element preferably has at least one substantially arch-shaped deviation from a flat form or an arch. Of course, it is also possible to provide a plurality of arch-shaped deviations/structures. The precise shaping of the arch is preferably roundish and/or is formed by at least one radius. The arch shape does not have to be approximately circular.

'Connecting section' shall substantially and preferably mean that this section of the cross-section of the profile element is suitable to connect the profile element e.g. to a wall of a machine tool cabin. 'Receiving section' shall substantially and preferably mean that this section of the cross-section of the profile element holds at least one element or that an element can be arranged thereto, which is suitable to create a securing connection e.g. of a pane or disk to the profile element.

Furthermore, it should be noted that the cabin wall of the machine tool to which the profile element can be secured can be both a solid wall of the cabin and a door of the cabin which can provide access to the cabin interior.

The advantages of the shaping of the cross-section of the profile section are that a high dimensional stability is guaranteed even when the profile is not very thick, as a result of which less material has to be used. Furthermore, the cross-section has sections on the respective outer sides in the cross-sectional direction, which sections are provided for securing the profile element on and/or to other parts, such as a cabin wall of a machine tool, inspection glass, etc., and the arch-shaped section in between. In particular on account of the shaping of the arch-shaped section, the profile element has an at least small spring action in the cross-sectional direction, which, in particular when the arch-shaped section is arranged according to the invention between receiving section and connecting section, counteracts mechanical stresses which might be produced e.g. when the profile element is attached to a machine tool. Furthermore, the resilient spring action of the arch-shaped section also offers optimum adaptability (at least with respect to minor adaptations) of the profile element to the outer form of a part to which the profile element shall be secured.

Besides, the profile element can have at least two connecting sections. One connecting section each can be arranged at the outer end of the cross-section of the profile element. Each of the connecting sections can partly have a flat shape.

'Partly have a flat shape' means in particular that at least a subsection has a flat shape in the cross-sectional direction of the connecting section. As a result of the flat shaping, a securement of the profile element to a cabin wall of a machine tool is possible with little effort.

Furthermore, at least one folded section can optionally be arranged at each of the two ends of the arch-shaped section. The folded section can be made so as to be connectable to a cabin wall of the machine tool or a window element. 'Folded section' substantially means that these optional sections have a bend or deformation which comprises a relatively small radius and/or relatively acute angle. The term "folded" shall here not limit the production method of this section to folding or bending. This shall rather serve to refer to the rough phenotypic form of the section.

The advantages of the arch are that, as explained above, in particular a spring action of the arch-shaped section is obtained. Furthermore, the folded sections allow a defined transition to be available between the arch-shaped section and the cross-sectional section bordering laterally thereon, which is e.g. usable to arrange cabin wall parts/sections or the like, preferably without gap, at the folded section so as to achieve a sealing action.

In addition, one folded section each can border on each side of the arch-shaped section. On one side of the cross-section of the profile element, the receiving section can be attached to the folded section and can have a flat shape. If no folded section is provided, the receiving section can border directly on the arch-shaped section.

A first connecting section which can have a flat shape can border on the receiving section in height-offset manner. A second connecting section can border on the folded section on the other side of the cross-section of the profile element—or, if no folded section is provided, the second connecting section can border directly on the arch-shaped section. The second connecting section can have a flat shape. The connecting sections can be formed to hold a sealing element and/or to arrange a connecting means thereon.

This shaping of the cross-section allows an improved securement to a machine tool cabin wall without complex adaptation work. A connecting means can be e.g. a screw (or screw connection), a rivet, etc. An adhesive strip can also be such a connecting means. A sealing element can be e.g. a rubber component which produces a gas and/or liquid sealing action.

The profile elements can be metal sheets, preferably deep-drawn. Furthermore, the profile elements can be made of a plastic material.

Thin, preferably deep-drawn, metal sheets have a relatively low weight, are cost-effective and can be produced in a not very complex fashion. The same also applies to plastic materials which can be produced/formed e.g. by means of casting or extruding.

According to the invention, a frame element for holding a transparent pane or disk and/or a pane-like or disk-shaped element at a cabin wall section of a machine tool can be formed of at least one profile element according to the invention.

The advantage is that substantially only one frame (element) adapted to a cabin wall is provided for securing a protection pane, such as the transparent pane, and/or the pane-like element. The cabin wall and/or the door of the cabin wall needs substantially not be adapted separately and with much effort as regards the shape of the pane and/or the pane-like element. The frame element can be composed of one or more joined profile elements. This can be carried out rapidly and with little effort. The pane-like element can have material throughout or only have material in a marginal section like a passe-partout, such that an inner section has no material.

When a plurality of profile elements form the frame element, four corner sections and four straight edge sections can be provided e.g. in the case of a substantially rectangular frame element. In particular when the frame element is provided for a door of the cabin, it can also have a U-shape, e.g. can be made as a single piece or with three straight sections and two corner sections each. The section of the U-shape which is open can be suitable e.g. to provide it with a door handle for opening the door. Another combination is, of course, also possible. The plurality of profile elements can e.g. be put together, welded or adhered to one another and/or be joined by means of screw or rivet connections in order to form frame element. Other joining or connecting techniques are also possible.

Therefore, a frame element for the secure holding of a pane and/or a pane-like element can be produced in a flexible way and by exploiting the advantages of shaping the cross-section of the profile elements according to the invention.

According to the invention, a cabin wall section of a numerically controlled machine tool can additionally be provided which has at least one pane. The pane can be connected to a cabin wall section in such a way that the pane can cover an opening in the cabin wall section. Furthermore, at least one substantially pane-like element can be provided which can be arranged on a side facing away from the machine and can be connected to the cabin wall section so as to be preferably detachable on the outer side. The cabin wall section can preferably be a door of the cabin.

'Detachable connection' means that the detachability is in particular non-destructive. The pane is preferably a transparent pane and more preferably a transparent inspection glass or protection pane through which an operator of the machine tool can observe and monitor the operational process in the interior of the machine tool cabin. 'Covered' here means substantially that the pane can be inserted in a window opening in the cabin wall and/or door or can be arranged in the opening area, such that the pane is arranged in/on the opening and optionally therebeyond. Therefore, the pane and the cabin wall jointly separate the cabin interior from the cabin exterior.

The substantially pane-like element can be a continuous pane, at least parts of which are transparent and which is similar or equal to the above described pane. Alternatively, the substantially pane-like element can also be a flat pane which does not have material throughout. In other words, the substantially pane-like element can be shaped similarly to a frame form or a passe-partout, i.e. can have material only in the marginal regions and have an opening/no material on an inner segment.

Advantages of this arrangement are that in particular a rapid and not very complex assembly of the pane and also of the substantially pane-like element is possible. The assembly is also in particular advantageously possible from an outer side of the machine tool. Furthermore, the substantially pane-like element can be readily exchanged and protects the pane at least in a marginal region of the pane against impairment/damage caused by scratches and dirt.

The (transparent) pane can also be connected to the cabin wall section by means of a rail element. A frame element can be arranged on the cabin wall section. The frame element can hold the substantially pane-like element. The frame element can be formed of at least one of the profile elements according to the invention.

The rail element can be a one-piece or multi-part element which, due to its shaping in isolation or in cooperation with the cabin wall of the machine tool, forms a groove-shaped structure. The pane can be introduced into this groove-shaped structure in particular along the outer edges thereof and can then be attached to the cabin wall e.g. by means of a clamping force applied by the rail element.

As a result of this connecting system, the production needs little effort and handling is easy in the case of maintenance work and, at the same time, a marginal region of the disk is protected against damage due to the substantially pane-like element.

Furthermore, the substantially pane-like element can be detachably connected to the frame element by means of a hook and loop (VELCRO®) fastener connection.

Due to the hook and loop (VELCRO®) connection, the substantially pane-like element is connected to the cabin wall and/or the frame element in a particularly time-efficient, not very complex and simultaneously secure way.

According to the invention, a cabin wall section of a numerically controlled machine tool can be provided with a frame element, formed of at least one profile element according to the invention. Furthermore, a first securing element can be provided which can be arranged on the receiving section of the profile element. A pane can be provided and can be connected to the frame element. In addition, a substantially pane-like element can be provided, as described above, and can have a second securing element which can be designed to form a detachable positive and/or material-bonded connection with the first securing element. The substantially pane-like element can be detachably connected to the cabin wall section on the outer side by means of the first and second securing means.

In particular, an advantage of the arrangement is that the pane and the substantially pane-like element and the holding devices thereof can be mounted on the cabin wall with little effort. The substantially pane-like element protects in particular an edge section of the pane against damage, said pane being more interior on the machine side. The substantially pane-like element can also be secured with little effort and in a rapidly exchangeable fashion. The arch-shaped section of the profile element has an elasticity due to which the pane-like element is held resiliently, at least to a minor degree, in such a way that no mechanical stresses occur.

Furthermore, at least one sealing element can be arranged on a connecting section. Together with the sealing element, the connecting section can engage in a groove which can be arranged on a cabin wall of the machine tool.

The groove is either produced by means of a separate element which is attached to the cabin wall, in isolation or in cooperation with a section of the cabin wall. Furthermore, the groove can also be provided in the cabin wall, i.e. without a separate element. The sealing element and the connecting section can be arranged within the groove and establish a gas-tight and/or moisture-tight connection to the cabin wall.

This connection between profile element/frame element and cabin wall can be established rapidly and with little effort. The machine and/or cabin interior are simultaneously protected against the penetration of dirt or the like.

In addition, the securing elements can be hook and loop (VELCRO®) fastener elements. The respectively first and second securing elements can preferably be a counterpart assigned to the first or second securing element, as a result of which a hook and loop (VELCRO®) fastener connection can be created.

The hook and loop (VELCRO®) connection allows a particularly time-efficient and not very complex but simultaneously secure attachment of the substantially pane-like element to the cabin wall and/or the frame element.

Furthermore, at least one of the connecting sections of the profile elements can be connected to the cabin wall by means of a screw connection. A connecting section of the profile element can preferably include the screw connection and a further connecting section can engage in the groove.

Due to a connection of the profile element/frame element by means of a screw connection on a side of the cross-section of the profile element and by means of an engagement in a groove (comparable to a tongue-and-groove connection) there can be a secure connection to the cabin wall using the least possible work steps. For example, it is also possible to dispense with a welded joint which is complicated and also more difficult to implement with respect to the possible distortion of the components—although a welded joint is not ruled out, e.g. when a long lasting connection is aspired.

Furthermore, the pane can cover an opening of the cabin wall. The preferably transparent pane can be connected to the cabin wall on the margins of the opening by means of a rail element that can have a further groove for receiving the edge of the transparent pane. The rail element can preferably be attached to the cabin wall by means of an adhesive joint and/or a screw connection.

It is particularly preferred to carry out the attachment of the rail element by means of an adhesive joint since this allows for a very fast and long-lasting connection which requires little effort.

In addition, a further securing means and a further sealing element can be arranged on the rail element. The rail element can be attached to the cabin wall in the vicinity of the frame element. The substantially pane-shaped element can be arranged on a section of the rail element and of the receiving section of the frame element. Furthermore, the substantially pane-like element can be detachably secured to the frame element and the rail element by means of the securing means which each can be provided on the frame element and the rail element. The substantially pane-like element can be attached in such a way that it can rest on the first securing element and on one of the folded sections of the frame element and on the further securing element and the further sealing element, which can be arranged on the rail element.

With this arrangement, the substantially pane-like element, in particular the marginal region of this element, can rest on the outer side of the machine above a marginal section of the pane and partly on the rail element and the frame element, thus covering at least part thereof, with a view to the arrangement from the outer side of the machine. Therefore, at least the marginal region of the pane is protected against damage when the pane-like element is like a passe-partout. If the pane-like element has material over the entire area, the entire pane is covered and protected. The pane and the substantially pane-like element can be maintained and exchanged from the outer side of the machine with little effort. In particular when there is no material in a central region of the space of the substantially pane-like element (i.e. the substantially pane-like element has the form of a passe-partout), in particular the securing region of the pane is protected against damage. However, the element is still light-weight and cost-effective on account of the opening in the inside area. When the substantially pane-like element is intransparent, e.g. colored in black or white, and has the form of a passe-partout, the securing region is also improved optically since it is covered.

Furthermore, the substantially pane-like element can have an inside portion which can be transparent or more preferably can have no material at all, and a marginal section which can be intransparent. The marginal section can preferably be colored in black or white.

As a result, the substantially pane-like element is light-weight and cost-effective and simultaneously optically covers securing regions of the pane et al.

Furthermore, a section of the frame element can have in the region of the arch-shaped section an opening for receiving substantially plate-like elements.

Such an opening can e.g. be suitable for securing a plate-like element, comprising plates or emblems, by means of plug-in connection. The plate can have e.g. safety-relevant instructions, type designations, manufacturer's names, etc. A plate which covers the opening can also be connected to the profile element e.g. by means of an adhesive joint.

The pane can preferably consist of glass and more preferably of safety glass and most preferably of polycarbonate. The substantially pane-like element can preferably consist of glass or a plastic material, more preferably of PMMA.

Furthermore, it can be preferred for the arch-shaped section not to be covered by the pane or the substantially pane-like element towards the outer side of the machine, i.e. this region is arranged to as to be visible to the outside.

In summary, it is by means of the invention therefore possible to provide a profile element for forming a frame element, a frame element and a cabin wall section with the frame element of a numerically controlled machine tool, which elements have a less complex design, can be made in a more cost-effective way, can be adapted to various machine types with less effort and wear out less rapidly.

The invention is described below by way of example with reference to the enclosed schematic diagrams, wherein.

Various examples of the present invention are described in detail below with reference to the drawings. Equal or similar elements in the drawings are here designated by equal reference signs. However, the present invention is not limited to the described implementing features but also comprises modifications of features of the described examples and combination of features of different examples on the basis of the scope of the independent claims.

Figure 1:
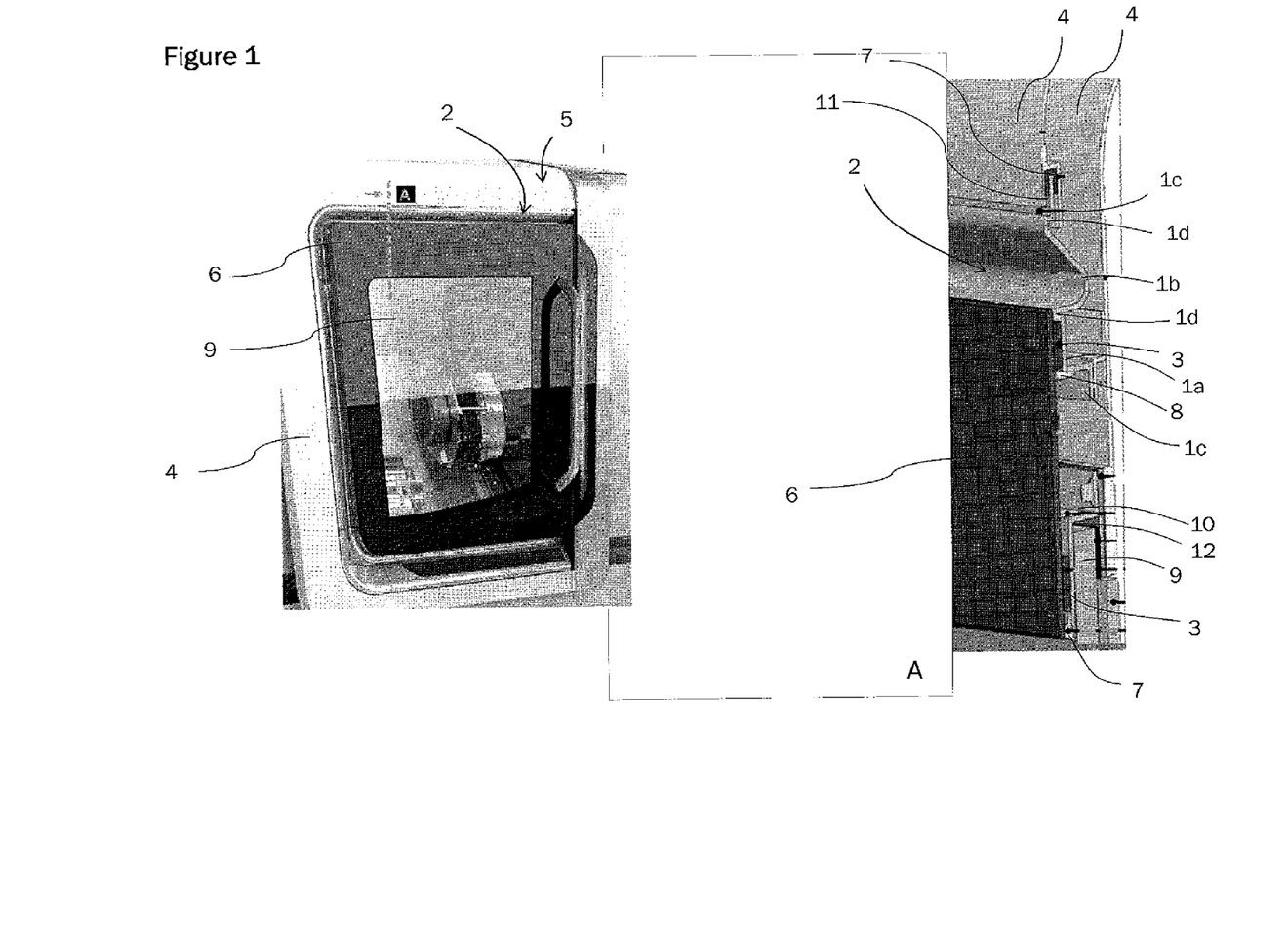
FIG. 1 shows a perspective view of a numerically controlled machine tool and an enlarged sectional view A through part of the front-side cabin wall of the machine tool.

FIG. 1 shows a front cabin wall section 4 of a machine tool 5 and in particular the cabin door where a frame element 2 is arranged which holds a substantially pane-like element 6. The cabin wall (section) and/or the door 4 have an opening which is covered by a transparent pane 9. As is found in the left-hand representation of FIG. 1, the frame element 2 runs along both an upper edge and a lower edge and also along a side edge of the pane-like element 6 in U-shaped fashion. A handle is provided on the edge of the pane-like element 6, which is shown on the right-hand side in the figure. The dashed line which is marked by the letter A shows the course of the sectional view "A" of the cabin wall and/or door 4, which is illustrated on the right-hand side in FIG. 1.

Cross-section A in FIG. 1 shows the pane-like element 6, which is secured in the region of a lower edge of the pane-like element 6 at a rail element 10 to the cabin wall 4. In a section in the region of the upper edge of the substantially pane-like element 6, the frame element 2 is arranged between the cabin wall 4 and the substantially pane-like element 6. The cross-section shows the securing means 3 which detachably connect the pane-like element 6 to the frame element 2 and the rail element 10.

The illustrated securing means 3 preferably have a two-part design each, one part of which is arranged on the substantially pane-like element 6 and another part is arranged on the frame element 2 or the rail element 10. Due to the preferably two-part design of the securing means 3, one part can be a counterpart of the second part so as to obtain a meshing connection between the two parts. The securing means 3 shown by way of diagram in FIG. 1 represent a hook and loop (VELCRO®) fastener connection, wherein the two parts are in each case counterparts of a hook and loop (VELCRO®) fastener connection. The hook and loop (VELCRO®) fastener connection advantageously permits to connect the substantially pane-like element 6 rapidly and with little effort to the cabin wall 4.

As also shown in the cross-section according to FIG. 1, the transparent pane 9 is held in a groove 12 which is arranged between the cabin wall 4 and the rail element 10. This is done e.g. by means of a clamping connection or for example also by an adhesive joint. On the outer side of the groove, the above described securing means 3 is arranged on the rail element 10 and holds a lower section of the substantially pane-like element 6. Furthermore, a sealing means 7 can be arranged in the region of a lower edge of the substantially pane-like element 6 between the rail element 10 and the substantially pane-like element 6. The sealing means 7 arranged thereon is preferably a rubber lip.

The frame element 2 shown in FIG. 1 in cross-section comprises at least one profile element 1. This profile element 1 has a three-dimensionally shaped structure which is divided into a plurality of subsections.

Figure 4:
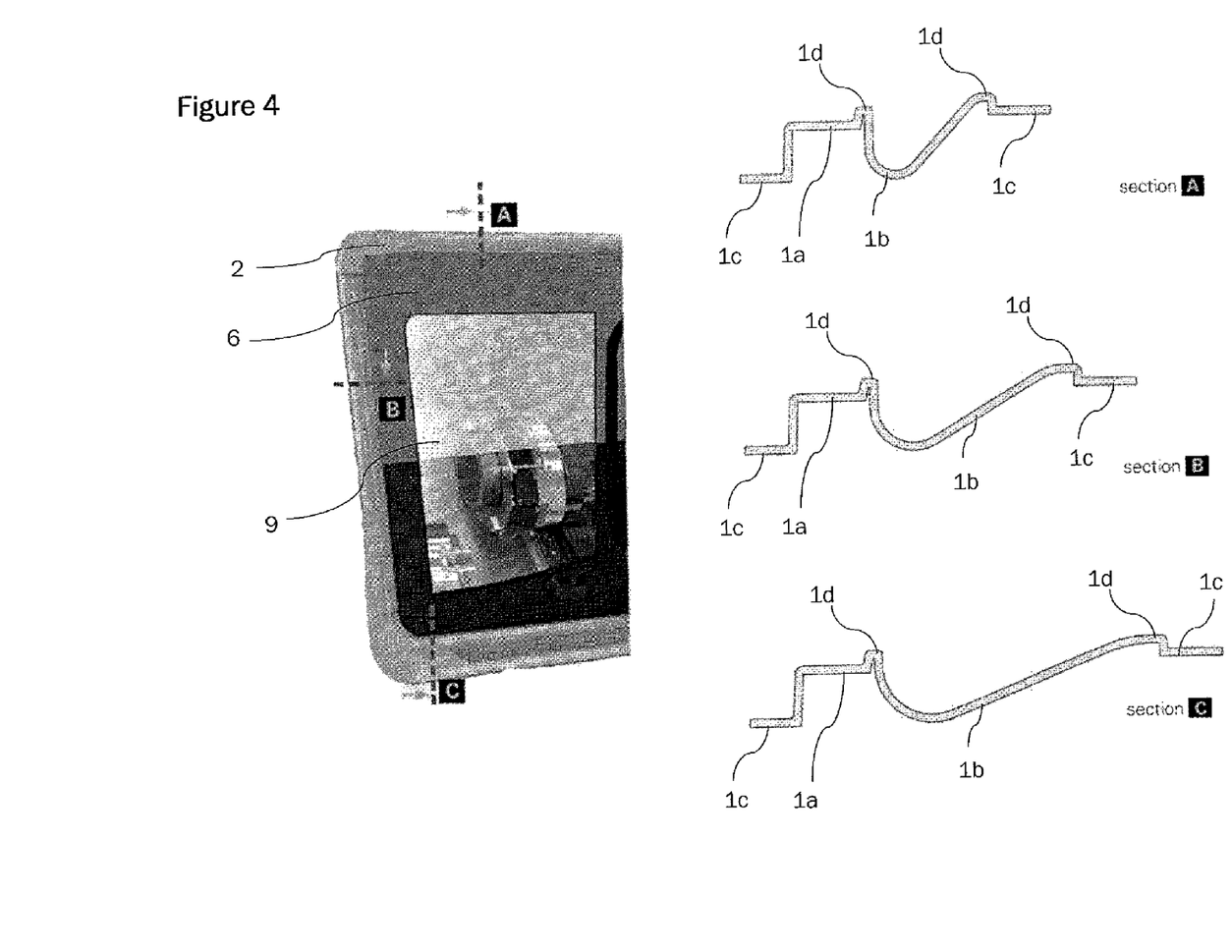
FIG. 4 shows a section of the front-side cabin wall and sectional views through the frame element according to the invention.

As illustrated in FIG. 1 and even more clearly in FIG. 4, the form of the profile element 1 has a receiving section 1a, where one of the securing means 3 is arranged. The receiving section 1a is a straight or at least partly straight section which borders on a connecting section 1c. The connecting section 1c has devices by means of which this connecting section 1c can be connected to the cabin wall 4. FIG. 1 shows by way of example the securement of the connecting section 1c by means of a screw connection 8. The section through the profile element 1 reveals that the receiving section 1a and the adjoining connecting section 1c are arranged step-wise with respect to one another. A folded section 1d borders on the receiving section 1a opposite to the connecting section 1c and is, as is shown in FIG. 1, in contact with an upper edge of the substantially pane-like element 6. An arch-shaped section 1b borders on this folded section 1d and has substantially the shape of an inverted question mark or an incomplete S.

The arch-shaped section 1b has in particular the advantage that on account of its shaping a slight spring action is achieved by means of which the pane-like element 6 can be held resiliently. Another folded section 1d borders on the arch-shaped section 1b and another connecting portion 1c borders on the section 1d. This connecting section 1c engages in the groove shown by reference sign 11 between a sheet, which is secured to the cabin wall 4 or is formed by the cabin wall 4 as such, and the cabin wall 4. A sealing element 7 is arranged around an end edge of the profile element 1 or the connecting portion 1c to establish a fluid-tight connection between the connecting section 1c and the cabin wall 4.

Figure 2:
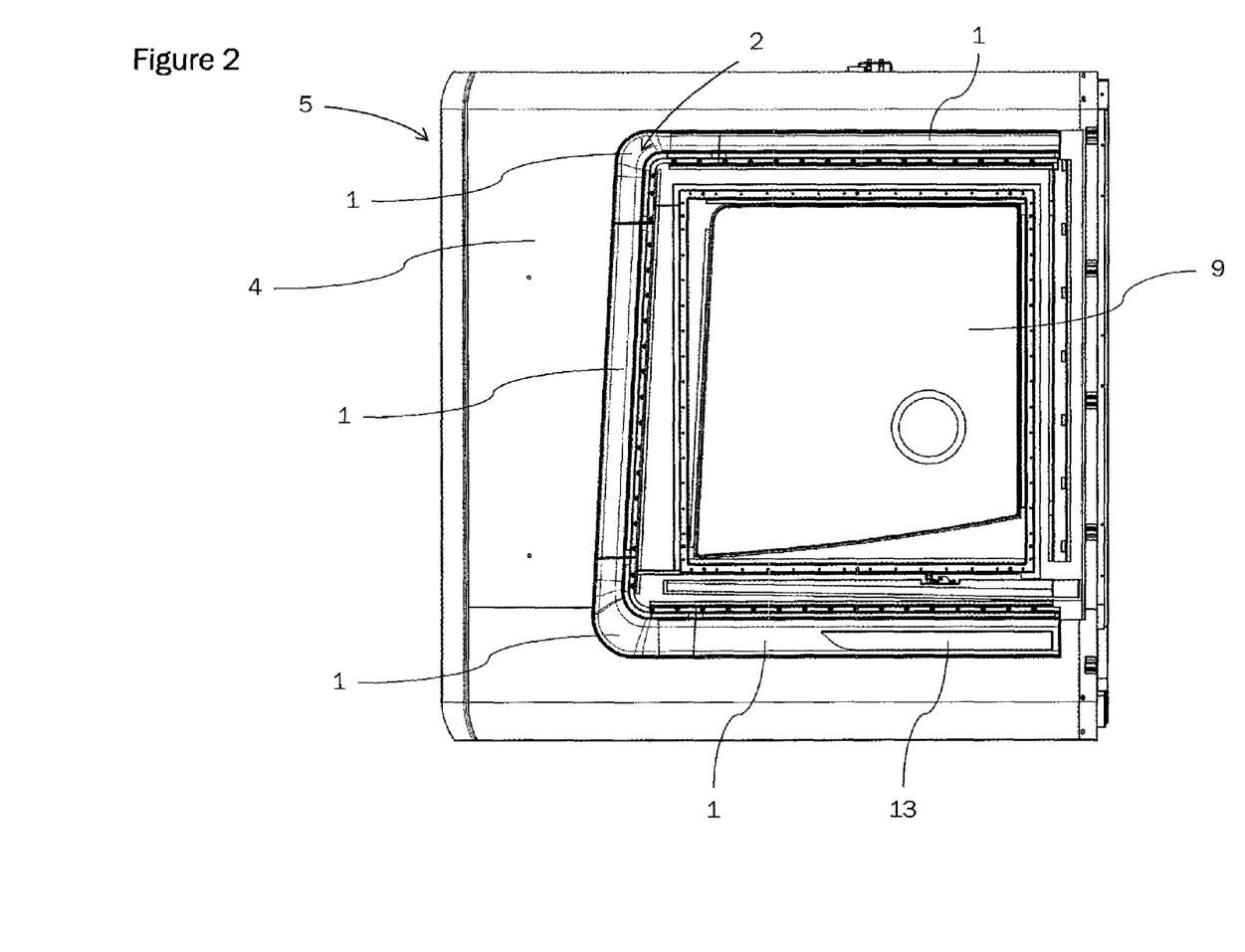
FIG. 2 shows a front view of the front-side cabin wall having a frame element according to the invention.
Figure 7:
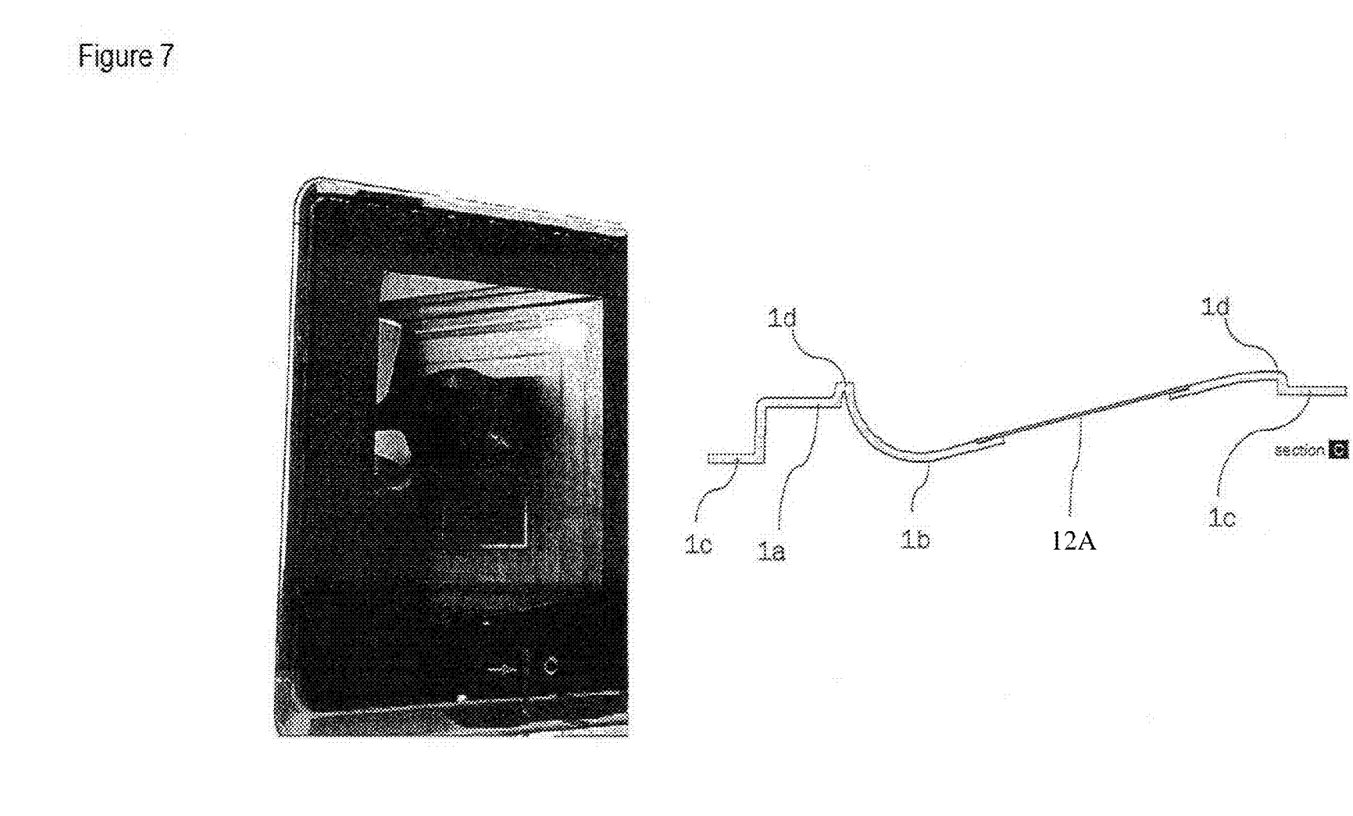
FIG. 7 shows a further section of the cabin wall having a further sectional view of the frame element according to the invention.

Furthermore, FIG. 2 shows a front view of a cabin wall 4, in particular the door, of the machine tool 5. The frame element 2 which is formed of a plurality of profile elements 1, and the transparent pane 9 covering the opening are also shown. The substantially pane-like element 6 which, as in the case of a passe-partout, has no material in an inside area is not shown in FIG. 2 or is dismantled. FIG. 2 also shows a plate-like element 13, which can be an emblem, for example. This plate-like element 13 is inserted in an opening 12A in profile element 1, shown in FIG. 7. This can be realized e.g. by means of a plug-in connection or an adhesive joint.

Figure 3:
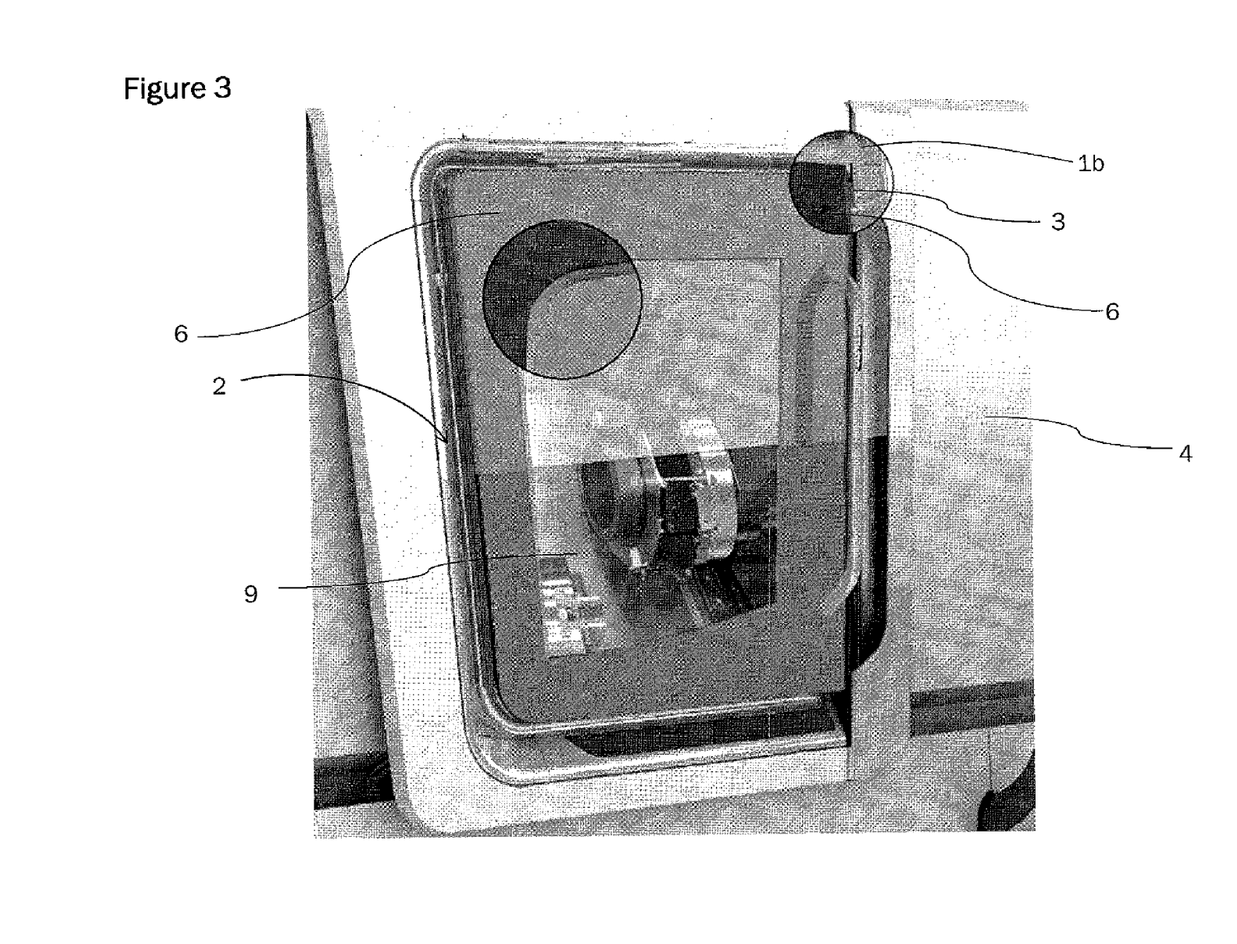
FIG. 3 shows a perspective view of the front-side cabin wall with enlarged sectional views.

FIG. 3 shows another perspective view of a tool cabin wall 4 having two magnified representations in the region of the substantially pane-like element 6. It is illustrated in FIG. 3 that the transparent pane is arranged between an inner side of the machine tool cabin and the pane-like element 6. On the outer side of the transparent pane 9, the substantially pane-like element 6 is arranged which, as shown in FIG. 3, has no material in an inside region, and therefore it has substantially the form of a passe-partout. In the region of the transition between the transparent pane 9 and the substantially pane-like element 6, as shown in the magnification, the rubber seal lip 7 is provided in the region of a lower edge of the substantially pane-like element 6 and externally seals in fluid-tight fashion the gap between the transparent pane 9 and the substantially pane-like element 6. Besides, the further magnification in FIG. 3 shows once again the attachment of the substantially pane-like element 6 by means of the securing means 3, preferably a hook and loop (VELCRO®) fastener, to the frame element 2.

FIG. 4 shows a section of the cabin wall 4 and/or the door and in particular the frame element 2 with the transparent pane 9 and the substantially pane-like element 6. As already described above, the frame-shaped element 2 can be composed of a one-piece profile element 1 can have a plurality of profile elements 1. The advantage of building up the frame element 2 from a plurality of profile elements 1 is that the cross-section of the respective profile elements 1 can easily be adapted as regards its shape to the outer contours of the cabin wall 4. For example, FIG. 4 shows three sections A, B, C through the frame element 2 at three different positions of the frame element 2. Hence it follows, as shown in the sectional views on the right-hand side in FIG. 4, that the respective basic form of the profile element 1 is substantially equal. However, the length of the profile element 1 of the different profiles elements 1 varies and also the radii thereof, in particular in the region of the arch-shaped section 1b. The cross-section through the profile element 1 at point A shows in particular a relatively short profile element 1 having a strongly bulged, arch-shaped section 1b. Due to this, a particularly good spring action can in particular be achieved when the pane-like element 6 is held. However, the profile element 1, which is arranged on a left-hand side edge of the frame element 2, in concrete terms at position B, shows a profile element 1 having a mean length compared to the two other profile elements 1. Furthermore, the profile element 1 arranged on the lower edge of the frame element 2 has a relatively long cross-section with a markedly less bulged, arch-shaped section 1b. All the shown profile elements 1 have in common that in each case a folded section 1d is attached on the right and on the left in the cross-sectional direction relative to the arch-shaped section 1b. A connecting section 1c is attached to the folded section 1d on a side of the arch-shaped section 1b, shown on the right in FIG. 4. On a left-hand side, initially a receiving section 1a and then a connecting section 1c are attached to the folded section 1d in a step-like fashion.

Figure 5:
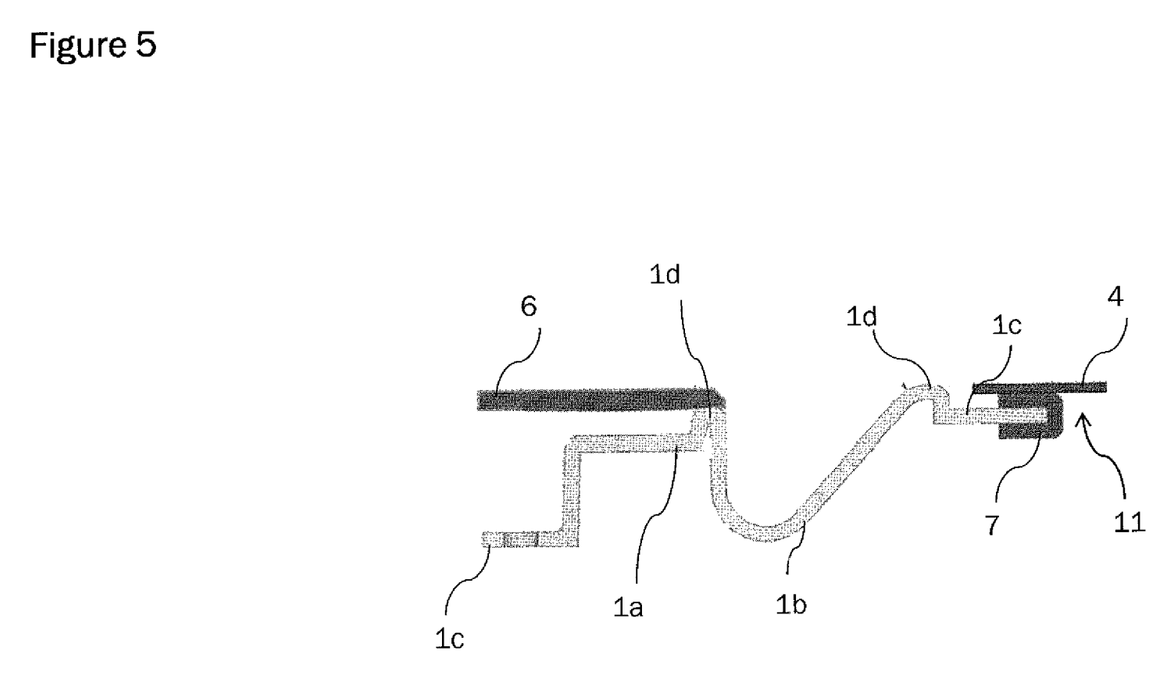
FIG. 5 shows a profile element according to the invention.

FIG. 5 substantially shows once again the profile element 1 including the above described sections 1a to 1d. Furthermore, FIG. 5 shows by way of diagram the arrangement of the folded sections 1d on the pane-like element 6 and the metal sheet or part of the cabin wall 4, forming the groove 11. Furthermore, it is shown how the sealing element 7, which has a U-shape, is arranged around the end region of the connecting section 1c which engages in groove 11 to create a fluid-tight connection between groove 11 and profile element 1. As shown in FIG. 5, a seal between the illustrated section of the substantially pane-like element 6 and the profile element 1 is carried out in such a way that the folded section 1d is in direct contact with a surface of the substantially pane-like element 6, which is arranged on the machine side. Furthermore, FIG. 5 shows by way of diagram a through bore in the connecting section 1c shown on the left for receiving a connecting means, for example a screw or a bolt.

Figure 6:
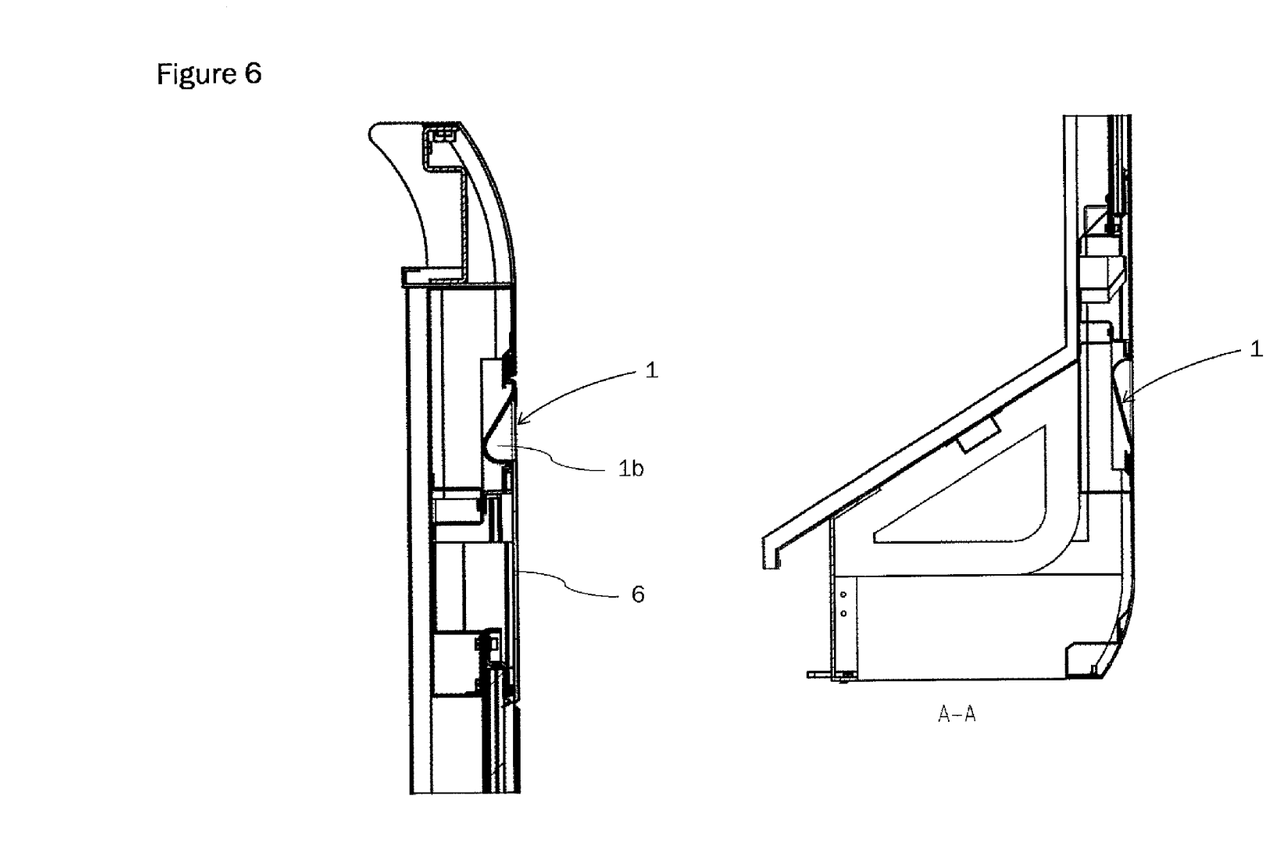
FIG. 6 shows sectional detailed views of the arrangement of the profile elements according to the invention relative to the cabin wall.

FIG. 6 illustrates further detailed views of a section through the cabin wall 4, which show in particular the arrangement of the profile element 1 and/or the frame element 2. In another sectional view through a lower section of the frame element 2 at the point marked by "C" in FIG. 7, the arrangement of the plate-shaped element 13, which is preferably an emblem, is shown in relation to an opening 12A in the region of the arch-shaped section 1b of the profile element 1.

Figure 8:
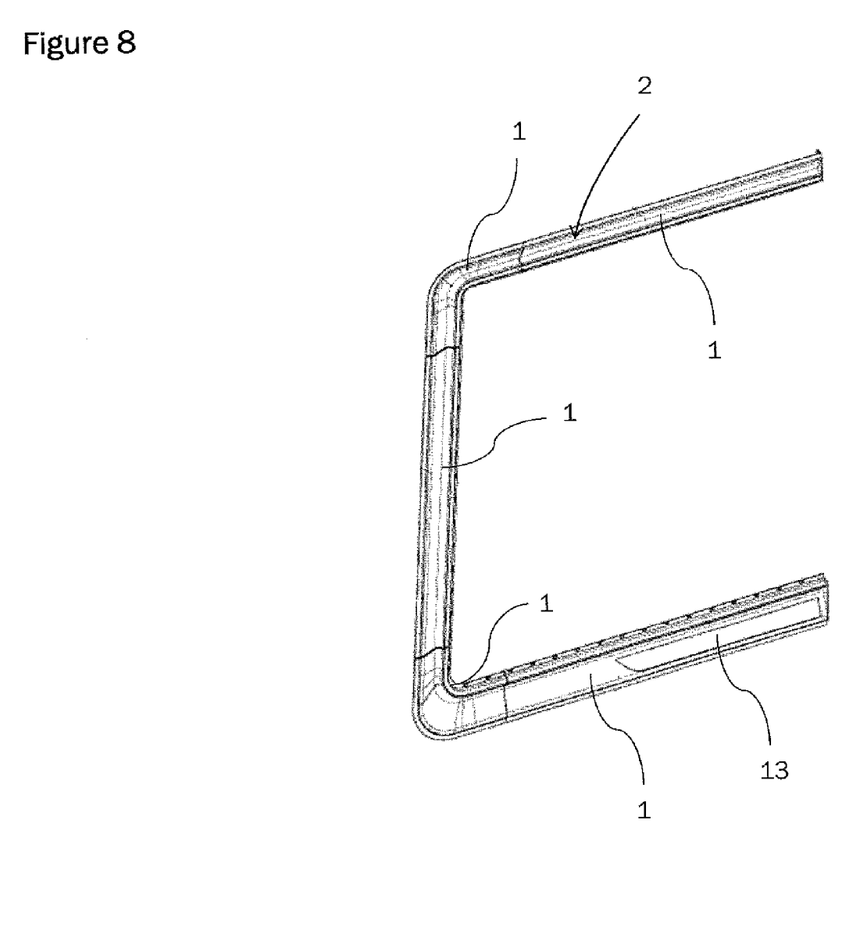
FIG. 8 shows a perspective view of the frame element according to the invention.

Furthermore, FIG. 8 shows a perspective view of the frame element 2, which in the illustrated representation is composed of five profile elements. Here, three straight profile elements 1 formed in the longitudinal direction form an upper edge, lower edge and side edge of the frame element 2. In addition, two profile elements 1, which are angular in the longitudinal direction, form the corner pieces of the frame element 2, where the straight profile elements 1 are arranged. The individual profile elements are preferably connected to one another by means of an adhesive joint. Furthermore, it is also possible to connect the profile elements by means of a plug-in connection. These are particularly preferred connecting methods when the profile elements 1 are made of a plastic material. Metallically formed profile elements 1 can also be joined by soldering or welding.

Figure 9:
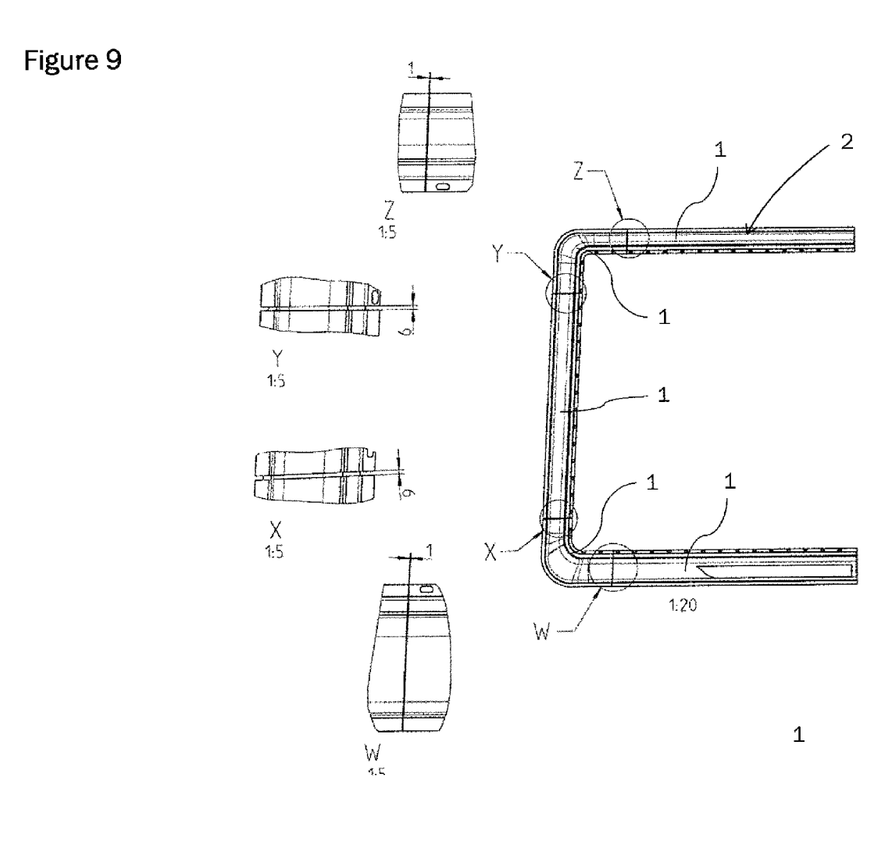
FIG. 9 shows a front view of the frame element according to the invention with individual magnifications.

FIG. 9 shows another view of the frame element 2, formed from the five, above described profile elements 1. The joints of the individual profile elements 1 are marked in FIG. 9 by letters W, X, Y and Z and are all shown in a magnified representation. These magnifications show substantially that a seamless transition is provided between the individual profile elements 1 for forming the frame element 2.

Thus, the advantages achieved are inter alia that the profile elements can be made with less effort and a frame element that can hold stress-free inter alia a pane-like element can be formed in a less complex fashion by means of the profile elements. The frame element can rapidly be attached to a door or a cabin wall section of a numerically controlled machine tool and is additionally adaptable with little effort to various machine types in a flexible way.

The invention claimed is:

1. A cabin wall section of a cabin wall of a numerically controlled machine tool, comprising:
   a frame element formed of one or more profile elements having at least one receiving section for receiving a first securing element, at least one arch-shaped section, and at least one connecting section for connecting the frame element to the cabin wall section, the arch-shaped section being arranged between the receiving section and the connecting section;
   a first securing element, which is arranged on the receiving section of the one or more profile elements;
   at least one pane, which is connected to the frame element; and
   at least one pane element, which has a second securing element that is designed to create a detachable positive and/or material-bonded connection with the first securing element;
   wherein the pane element is detachably connected on an outer side to the cabin wall section by the first and second securing elements,
   wherein at least one sealing element is arranged on one of the at least one connecting section of the one or more profile elements, and
   wherein the at least one connecting section of the one or more profile elements is, together with the sealing element, in engagement with a groove which is arranged on the cabin wall section.

2. The cabin wall section according to claim 1, wherein the securing elements are hook and loop fastener elements, wherein in each case the first securing element is a counterpart assigned to the second securing element, for creating a hook and loop fastener connection.

3. The cabin wall section according to claim 1, wherein the at least one connecting section of the profile element comprises at least two connecting sections, and at least one of the connecting sections is connected to the cabin wall by a screw connection, and another one of the connecting sections engages in a groove.

4. The cabin wall section according claim 1, wherein
the pane covers an opening of the cabin wall and is connected to the cabin wall at edges of the opening by a rail element which has a further groove to receive an edge of the pane, wherein
the rail element can be secured to the cabin wall by an adhesive joint and/or a screw connection.

5. The cabin wall section according to claim 1, wherein the pane element has an inside area section which is transparent or has no material and has a marginal section which is intransparent or colored in black or white.

6. The cabin wall section according to claim 1, wherein in the region of the arch-shaped section a section of the frame element has an opening for receiving at least one plate element.

7. The cabin wall section according to claim 1, wherein the pane consists of safety glass or polycarbonate and the pane element of glass or a plastic material or PMMA.

8. A cabin wall section of a cabin wall of a numerically controlled machine tool, comprising:
a frame element formed of one or more profile elements having at least one receiving section for receiving a first securing element, at least one arch-shaped section, and at least one connecting section for connecting the frame element to the cabin wall section, the arch-shaped section being arranged between the receiving section and the connecting section;
a first securing element, which is arranged on the receiving section of the one or more profile elements;
at least one pane, which is connected to the frame element; and
at least one pane element, which has a second securing element that is designed to create a detachable positive and/or material-bonded connection with the first securing element;
wherein the pane element is detachably connected on an outer side to the cabin wall section by the first and second securing elements, and
wherein a further securing element and a further sealing element are arranged on a rail element and the rail element is secured to the cabin wall section adjacent to the frame element, wherein the pane element can be arranged on a section of the rail element and of the at least one receiving section of the one or more profile elements.

9. A cabin wall section of a cabin wall of a numerically controlled machine tool, comprising:
a frame element formed of one or more profile elements having at least one receiving section for receiving a first securing element, at least one arch-shaped section, and at least one connecting section for connecting the frame element to the cabin wall section, the arch-shaped section being arranged between the receiving section and the connecting section;
a first securing element, which is arranged on the receiving section of the one or more profile elements;
at least one pane, which is connected to the frame element; and
at least one pane element, which has a second securing element that is designed to create a detachable positive and/or material-bonded connection with the first securing element;
wherein the pane element is detachably connected on an outer side to the cabin wall section by the first and second securing elements, and
wherein the pane element is detachably secured to the frame element and a rail element by a plurality of securing elements including the first and second securing elements, the plurality of securing elements being provided on the frame element and the rail element, such that the pane element rests on the first securing element and on folded sections of the one or more profile elements of the frame element and on a further securing element of the plurality of securing elements and a sealing element, which are arranged on the rail element.

10. A cabin wall section of a cabin wall of a numerically controlled machine tool, comprising:
a pane which is connected to the cabin wall section via a rail element in such a way that the pane covers an opening in the cabin wall section, and
a pane element which is arranged on a side of the pane facing away from the machine tool,
wherein a frame element formed by one or more profile elements holds the pane element,
wherein the frame element is detachably connected on an outer side to the cabin wall section adjacent to the rail element, and the pane element is detachably connected to the frame element via a hook and loop fastener connection and is further detachably connected to the rail element via another hook and loop fastener connection.

* * * * *